United States Patent [19]
Meyers

[11] 4,193,868
[45] Mar. 18, 1980

[54] ION EXCHANGE METHOD AND APPARATUS
[75] Inventor: Peter S. Meyers, Covina, Calif.
[73] Assignee: Chromalloy American Corporation, City of Industry, Calif.
[21] Appl. No.: 910,675
[22] Filed: May 30, 1978
[51] Int. Cl.$^2$ .............................................. B01D 15/06
[52] U.S. Cl. ................................. 210/35; 137/110; 137/517; 210/118; 210/136; 210/289
[58] Field of Search ............... 137/110, 517; 210/35, 210/136, 117, 118, 275–278, 289, 291

[56] References Cited
U.S. PATENT DOCUMENTS

| | | | |
|---|---|---|---|
| 1,524,257 | 1/1925 | Kensig | 137/110 |
| 2,268,607 | 1/1942 | McGill | 210/289 |
| 2,665,704 | 1/1954 | Kanuch | 137/110 |
| 3,323,533 | 6/1967 | Reimer | 137/110 |
| 3,339,737 | 9/1967 | Kiscellus et al. | 210/136 |
| 3,622,004 | 11/1971 | Meyer | 210/136 |
| 3,847,805 | 11/1974 | Voedisch | 210/291 |

Primary Examiner—Thomas G. Wyse
Assistant Examiner—Ivars Cintins
Attorney, Agent, or Firm—Edward D. O'Brian

[57] ABSTRACT

An ion exchange apparatus having a plurality of channels or manifolds used for liquid distribution and collection purposes within an end of a container adjacent to an ion exchange resin bed can be improved by using a check valve permitting flow in one direction to all of the channels as the bed is being employed under "service" conditions to treat water and permitting flow in the opposite direction in less than all of the channels as the bed is being treated with a regenerant solution. Such use of less than all of such panels during the treatment of the bed with the regenerant solution makes it possible to achieve good distribution of a relatively small amount of the regenerant solution and to receive regeneration of the bed utilizing such a comparatively small amount of the regenerant solution.

8 Claims, 2 Drawing Figures

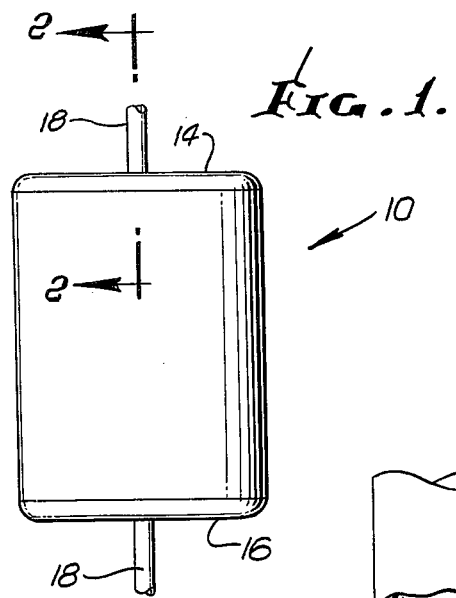
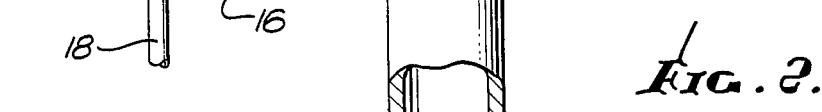
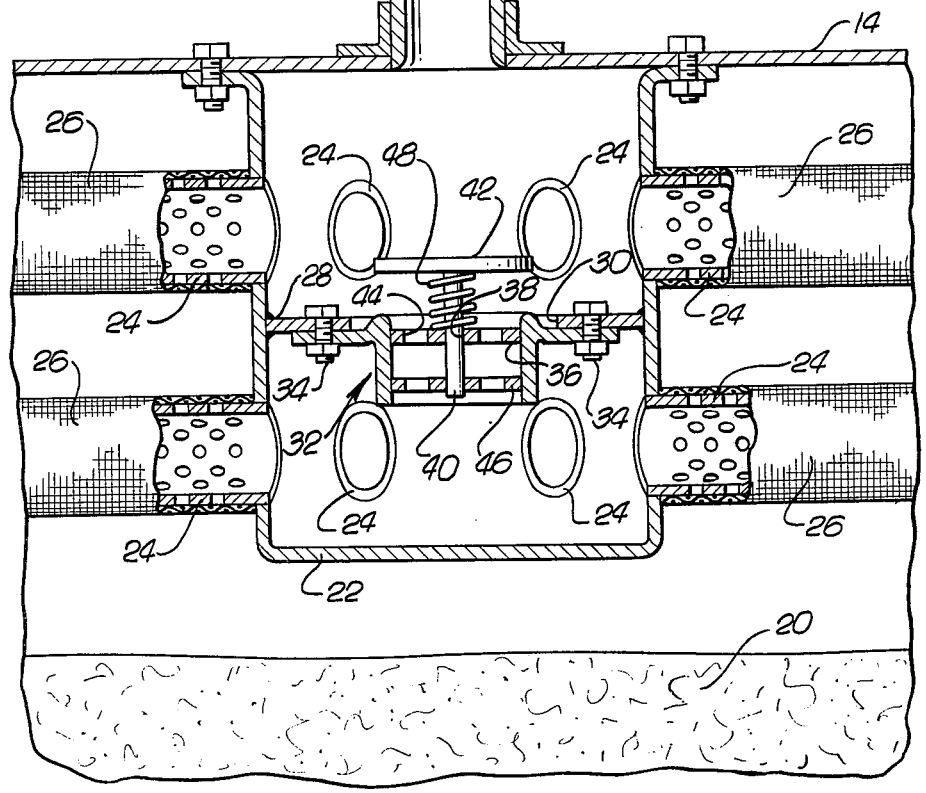

ION EXCHANGE METHOD AND APPARATUS

BACKGROUND OF THE INVENTION

In its broadest aspect the present invention pertains to a new and improved apparatus and method for conveying separate liquids into and out of a container. More specifically, however, the present invention is directed to a new and improved ion exchange apparatus and method involving the flow of liquid treated in an ion exchange resin bed out of a container and involving the flow of regenerant solution into the container.

It is well known to treat water utilizing an ion exchange bed to remove various ions from the water being treated. A suitable ion exchange apparatus for this type of utilization is normally constructed so as to utilize a container holding the ion exchange material which is provided with liquid distribution and collection channels, manifolds or similar structures at the opposite ends of the bed of ion exchange material. During the "service" use of such an apparatus for ion exchange purposes water is introduced into the container at one end of the bed and passes through the bed and then out of the container at the other end of the bed. After a period of such use such a bed is normally regenerated by passing a regenerant solution through the bed.

Although such a regenerant solution may be passed through the bed in the same direction in which water is passed through the bed during "service" use of the apparatus, it is frequently desirable to pass a regenerant solution through the ion exchange bed in a direction which is opposite to the direction of flow during service use. This is referred to as countercurrent flow regeneration. Since the reasons for the use of countercurrent flow regeneration are considered to be well known in the field of treating water by ion exchange, it is not considered necessary to discuss it in this specification.

While unquestionably the same channels, manifolds or the like at each end of the container in an ion exchange apparatus can be utilized to convey both the water treated and to convey the regenerant solution used in regenerating the ion exchange bed, such use of the same distribution-collection channels or manifolds is considered to be disadvantageous. This is because different flow conditions are optimum in connection with treating water so as to remove ions from such water and in connection with the regeneration of ion exchange material. It is considered preferable to pass comparatively large quantities of water through an ion exchange bed during normal service conditions at a comparatively low pressure. As opposed to this during regeneration it is considered preferable to pass smaller quantities of the regenerant solution to the bed at a higher pressure.

It is not considered necessary to discuss the reasons for this in detail in this specification since an understanding of the reasons is not considered necessary to an understanding of the present invention. The use of the same channels or manifold type structures in conveying water under service conditions and in conveying a regenerant solution at different times during the operation of an ion exchange bed is not considered desirable because of the different flow requirements during service use of such a bed and during the regeneration of such a bed. In spite of this because of economic considerations it has been commonplace to use the same channels, manifolds or the like for both of these purposes. Such economic factors also make it undesirable to install separate structures for use with water being treated and for use with a regenerant solution.

SUMMARY OF THE INVENTION

A broad objective of the present invention is to provide a new and improved ion exchange apparatus and method. More specifically this invention is intended to provide ion exchange apparatuses constructed so as to utilize a single set or group of manifolds, channels or the like for both service and regenerant flow but which is also constructed so as to handle comparatively large quantities of water at a comparatively low pressure during service use and so as to handle and distribute lesser quantities of regenerant solution at a higher pressure during regeneration of the ion exchange bed.

A further objective of the present invention is to provide an apparatus of the type indicated which may be manufactured at a comparatively nominal cost. A still further objective is to provide an apparatus as indicated in the preceding which is effective for its intended purpose and which may be utilized over a prolonged period with minimal maintenance. A related objective of the invention is to provide a simple, effective, easily practiced method for controlling service and regenerant flow in an ion exchange apparatus.

In accordance with this invention these objectives are achieved by providing a fluid treatment apparatus including a container, a fluid port leading into said container, the port being utilized periodically to convey liquid into the container and to periodically convey a liquid out of the container in which the improvement comprises: a plurality of distribution and collection channel means located within the container adjacent to the port, and check valve means responsive to fluid flow in one direction positioned so as to control liquid flow into and out of less than all of the channel means.

BRIEF DESCRIPTION OF THE DRAWING

Because of the nature of this invention it is considered that it is best more fully described with reference to the accompanying drawing in which:

FIG. 1 is a side elevational view partially broken away of a countercurrent flow ion exchange apparatus for use in treating water; and FIG. 2 is a partial cross-sectional view at an enlarged scale taken at line 2—2 of FIG. 1.

The particular apparatus illustrated in the drawing is not intended to directly correspond to any specific commercial piece of equipment but is intended to illustrate a presently preferred form of an apparatus in accordance with the invention and to illustrate the principles or concepts of this invention as set forth and claimed in the appended claims. These principles or concepts can be utilized in a number of differently constructed ion exchange apparatuses through the use or exercise of routine engineering skill in the ion exchange field.

DETAILED DESCRIPTION

In the drawing there is shown an ion exchange apparatus 10 which utilizes an elongated cylindrical container 12. Those parts of the apparatus 10 not specifically indicated in the drawing or in the specification are preferably constructed in accordance with conventional practice. This container 12 has an upper end 14 and a lower end 16, each of which is provided with a centrally located pipe 18 used in conveying liquid to or from the container 12. Within the interior of the container 12 there is a bed 20 of discreet ion exchange particles. The present invention primarily concerns the structure (not separately numbered) within the container 12 at the upper end 14 for use in controlling the movement of fluid.

This structure includes an elongated hollow, cylindrical, hub-like manifold 22 which is mounted on the end 14 so as to be in communication with the pipe 18 leading into this end 14. Two different sets (not separately numbered) of hollow perforate pipes 24 serving as hollow channels are attached to the manifold 22 in two different planes (not separately numbered) which are parallel to one another and which are located along the length of the manifold 22 and transverse to the axis of the manifold 22. Each of the pipes 24 is preferably covered with a screen 26 in a conventional manner so as to prevent particles from within the bed 20 entering these pipes 24 during service use. These pipes 24 extend from the manifold 22 in a spoke-like manner and are located equidistant from one another around the axis of the manifold 22. They are intended to extend within the container 12 adjacent to the end 14 so as to provide for relatively uniform flow of liquid passing between the ends 14 and 16 of the container 12.

Within the interior of the manifold 22 there is located a mounting plate 28 having a centrally located opening 30. This plate 28 is located so as to close off the interior of the manifold 22 so as to separate the pipes 24 into two groups (not separately numbered). A flow responsive, normally open check valve 32 is mounted on this plate 28 through the use of conventional fasteners 34. The particular check valve 32 illustrated includes a perforate support plate 36 having a centrally located guide holes 38. A cylindrical stem 40 is mounted in this guide hole 38 so as to be capable of reciprocating relative to the plate 36. A valve member 42 capable of fitting against the plate 36 so as to close off the holes 44 in this plate 36 is located on one end of the stem 40 while a perforate retainer plate 46 is located on the other end of the stem 40. A small coil spring 48 is located around the stem 40 between the support plate 36 and the valve member 42 for the purpose of biasing the check valve 32 in an open position.

As the apparatus 10 is utilized for so-called service use in treating water so as to remove ions, the water to be treated is introduced into the lower end 16 so that it can flow upwardly through the bed 20. As this occurs the water passing through the bed 20 will reach all of the pipes 24 and will flow through these pipes 24 into the manifold 22 and thence out through the pipe 18 in the end 14. Normally such flow during service use will involve comparatively large volumes of water moving as a result of comparatively low pressure which will travel upwardly through the bed 20 at a comparatively low velocity. Normally the capacity of all of these pipes 24 will be such as to present little resistance to such flow.

When it becomes necessary to regenerate the bed 20 a regenerant solution will be supplied to the end 14 through the pipe 18 attached to this end 14. Normally this regenerant solution will be at a higher pressure than utilized during the service use of the apparatus 10. Such a regenerant solution will act against the valve member 42 so as to move this valve member 42 in order to close off the check valve 32. As a result of this the regenerant solution will only flow into those pipes 24 above the check valve 32. As a consequence of this the pipes 24 beneath the check valve 32 will be closed or shut off. Those pipes 24 used with the regenerant solution will serve to distribute the regenerant solution reasonably uniformly across the end 14 of the container 12 and will be adequate to distribute the regenerant solution downwardly at a comparatively low flow rate which is most effective to accomplish regeneration of the ion exchange bed 20. After a suitable period of such regeneration the regenerant solution will, of course, no longer be supplied to the container 12 and the apparatus 10 will be ready for service use.

It will be realized that the concepts indicated in the preceding can be utilized with quite a variety of different structures. Different numbers of pipes corresponding to the pipes 24 can be utilized and different numbers of rows of such pipes 24 can be employed. The important thing in accordance with the invention is to utilize one or more check valves as indicated so that during flow in one direction liquid can pass through all of the pipes 24 serving as channels and so that less than all of the pipes 24 are used during flow in the reverse direction, as for example, during regeneration of the bed 20. Although individual check valves can be utilized in connection with each of the pipes 24 it is considered that it is preferable to utilize a structure as illustrated employing only a single check valve since obviously a single check valve of a reasonable size is less expensive than a plurality of check valves even though such individual check valves may be of slightly smaller dimension.

I claim:

1. A fluid treatment apparatus including a container having ends, a first fluid port leading into one end of said container, a second fluid port leading into the other end of said container, both of said ports being utilized periodically to convey a liquid into said container and periodically to convey a liquid out of said container in which the improvement comprises:
   a plurality of distribution and collection channel means located within said container adjacent to said first port, and,
   check valve means responsive to fluid flow in one direction positioned so as to be open in response to fluid flow in one direction through said container between said ports and so as to be closed in response to fluid flow through said container in the other direction between said ports, said check valve means being positioned with respect to said channel means so as to be responsive to flow between said ports in order to permit flow through all of said channel means when a liquid is flowing from one of said ports to the other of said ports and in order to permit flow through less than all of said channel means when a liquid is flowing from the other of said ports to said one of said ports.

2. An apparatus as claimed in claim 1 wherein:
   said apparatus is an ion exchange apparatus,
   said apparatus includes a bed of ion exchange particles located within said container,
   said channel means are used in conveying a liquid to and from said bed of particles.

3. An apparatus as claimed in claim 1 including:
   a distribution manifold located within said container, said manifold being connected to said first port, said distribution channel means comprising a plurality of separate elongated channels connected to said manifold, said check valve means is a single check valve located within said manifold between at least two of said channels so as to control flow into and out of less than all of said channels.

4. An apparatus as claimed in claim 3 wherein:

said check valve is normally open and closes in response to flow from said first port toward said second port.

5. An apparatus as claimed in claim 4 wherein:

said container has an upper end, said first port and said manifold are centrally located within said upper end, said channels extend radially outwardly from said manifold.

6. The apparatus as claimed in claim 5 wherein:

said channels are located so that at least some of said channels are segregated from other of said channels along the length of said manifold, said check valve is located within said manifold between channels which are segregated from one another along the length of said manifold.

7. An apparatus as claimed in claim 1 including:

a distribution manifold located within said container, said manifold being connected to said first port, said distribution channel means comprising a plurality of separate elongated channels connected to said manifold, and wherein said apparatus is an ion exchange apparatus, said apparatus includes a bed of ion exchange particles located within said container, said channel means are used in conveying a liquid to and from said bed of particles, said check valve is normally open and closes in response to flow from said first port toward said second port, one of said ends of said container is an upper end, said first port and said manifold are centrally located within said upper end, said channels extend radially outwardly from said manifold, said channels are located so that at least some of said channels are segregated from other of said channels along the length of said manifold, said check valve is located within said manifold between channels which are segregated from one another along the length of said manifold.

8. A process of operating an ion exchange apparatus including a container having a top and bottom, ends, conduits leading into the ends of said container, a plurality of channel means located at the top of said container, all of said channel means being connected to said conduit at the top of said container, check valve means being located so as to be capable of preventing flow from the conduit at the top of the container into at least some of said channels, a bed of ion exchange resin within the interior of said container which comprises steps of:

alternatively passing water to be treated upwardly through the bed and then passing a regenerant solution downwardly through said bed, and utilizing the downward flow of said regenerant solution to actuate said check valve means so that said regenerant solution is distributed within said container through less than all of said channels.

* * * * *